Patented July 3, 1923.

1,460,832

UNITED STATES PATENT OFFICE.

KEIZO WOOYENAKA, OF TOKYO, JAPAN, ASSIGNOR TO JOKICHI TAKAMINE, OF NEW YORK, N. Y.

PROCESS FOR THE RECOVERY OF THE ACTIVE PRINCIPLE OF THE SUPRARENAL GLANDS.

No Drawing.    Application filed December 27, 1920.  Serial No. 433,259.

*To all whom it may concern:*

Be it known that I, KEIZO WOOYENAKA, a subject of the Emperor of Japan, and a resident of the city of Tokyo, Japan, have invented certain new and useful Improvements in Processes for the Recovery of the Active Principle of the Suprarenal Glands, of which the following is a specification.

My invention relates to new and useful improvements in processes for extracting from suprarenal glands the product having the active blood-pressure raising, astringent, and hemostatic characteristics and properties of said glands, and in the form designated the active principle of the suprarenal glands.

The primary objects of the invention are to provide a process involving extraction and purification, which will be highly efficient in obtaining an exceedingly pure product of the active principle, and which will simplify the labor and procedure of extraction and purification, as well as permit an efficient recovery of a purified product in less time and more economically than has been hitherto possible by known processes.

A previous method of extraction which has been extensively employed, has been to treat the raw glands with water to thereby make a water extract, the extraction being accompanied by heat, and under imperative conditions inhibiting oxidation of the raw product, which extraction not only consumed an excessive period of time, i. e., five to ten hours, but necessitated precautions in order to insure non-oxidation of the product which complicated the process.

As is well-known, the raw suprarenal glands contain approximately only one part of the active principle in 750 to 1000 parts by weight of the raw gland, and therefore, an extraction, according to the prior process mentioned, required the use proportionately of a large amount of water, and an expenditure of time and labor, which was attended with likelihood to oxidation by long exposure to the air, especially in a highly attenuated state of the aqueous extract, all of which the step of extraction constituting my present invention avoids.

Again, in purifying the raw product containing the active principle, according to the prior process, a fairly pure final product was obtained by dissolving the raw product in the least possible amount of acetic, or other acids, in the presence of a certain quantity of alcohol, in order to cause mineral and other objectionable matters to be separated from the active principle. The final crystalline substance was then thrown out or separated by means of alkali, especially ammonia or carbonate of alkalies. The raw product of active principle obtained by the extraction step of the prior art process referred to, contained generally 7 to 10 per cent of ash when burnt, and the purification step mentioned was only able to purify the product so as to remove one-half, or at the maximum two-thirds of the impurities contained in the raw product, so that the purified active principle finally contained from 3 to 4 per cent ash.

I have discovered that the process of extraction, and the purification of the raw product will be greatly simplified, and a larger yield of final product of enhanced purity will be produced by the process constituting my present invention, to be hereinafter set forth.

I will first describe the process of extraction of the raw product from the suprarenal gland material, and will then describe the procedure for the purification of such raw product.

*Process of extraction.*

According to the preferred procedure of my invention, I take 100 pounds by weight of fresh suprarenal glands and reduce the same to a pulp, preferably by grinding by any suitable means, and mix said pulp with approximately 200 parts by weight of acidified water. The water is preferably acidified with hydrochloric acid so as to contain approximately $\frac{3}{10}$ of 1 per cent of said acid, or I may use any other suitable organic or inorganic acid, except such oxy-acids as chromic, chloric, iodic acids, etc., suitable acids for the purpose being nitric, sulphuric, oxalic, acetic, lactic, butyric, or any other acid, which, when diluted as described, will have no oxidizing power upon the active principle sought to be obtained. By oxyacids, I mean those which would have oxidizing power or effect upon the active principle, even should said acids be used in great dilution.

The mixture of gland pulp and acidified water, and containing the active principle is warmed to a temperature not exceeding 55° C., and to the warmed pulp is added a proteolytic enzyme, such for example, as pepsin, papain, or bromelin, in certain proportion, according to the specific enzyme employed.

I prefer to employ pepsin of the U. S. P., to any other enzyme, since it can be obtained easily in the market, and its proteolytic or peptogenic property can be relied upon for almost an indefinite period, while the other enzymes mentioned, i. e., papain and bromelin, while efficient, must be freshly prepared at the time of use, owing to their instability for keeping. I preferably use the pepsin in a proportion of one part of the same by weight to 1500 parts of the fresh gland pulp, but I desire it understood that this proportion is not determinative or imperative, and can be varied more or less, although the proportion employed is preferred as being most suitable for efficient working of the process, as I am at present advised.

The pulp mass having the proteolytic enzyme, i. e., the pepsin, added thereto, is agitated, for example, by stirring, so as to more efficiently subject the pulp containing the active principle to the proteolytic action of the enzyme employed, the stirring being carried on continuously, or repeated from time to time, the temperature during such treatment being maintained as near 55° C. as possible. The temperature is maintained at approximately 55° C. during the treatment with the pepsin, for the reason that said temperature is the critical optimum temperature for the best and most efficient action of the enzyme, temperatures above 55° resulting in a decreased action of the enzyme, and temperatures as high as 65° to 70° C. resulting in destruction of the proteolytic action. The action of the proteolytic enzyme is to render the proteids and albuminous matter soluble by digestion, thereby converting the same into soluble products, such as peptones, and destroying the cell structure containing or enclosing the active principle, thereby releasing the latter. The cell is destroyed or broken open by the proteolytic action, thereby releasing the active principle, as distinguished from the releasing or recovering of the principle by osmosis. The pulpy mass is subjected to the proteolytic enzyme, in the manner described, for approximately one hour from the time it is observed that proteolytic action, or the peptic digestion, is initiated, whereupon, it will be seen that the pulpy mass has become very thin or limpid, after which the temperature of the entire liquid is raised to about the boiling point of water, at which temperature it is maintained for a period of 10 to 15 minutes, in order to stop the proteolytic action of the enzyme, and, by reduction of density, to facilitate filtering.

Instead of pepsin, or the other proteolytic enzymes mentioned, I may employ pancreatin, or similar enzyme, but in case pancreatin is employed, the digestion or proteolytic action is not carried on in an acid medium, i. e., acidified water, because the presence of the acid acts to retard the proteolytic action of the pancreatin. The slight acidity found in the material of suprarenal glands, however, will not be sufficient to impede the digestive action of the pancreatin. When pancreatin is employed, it may be used in the proportions of one part by weight to 250 parts by weight of the fresh glands subjected to extraction, but all other manipulations are similar to those above described when employing pepsin, except that the water is not acidified.

The liquid, which has been subjected to the proteolytic or digestive action, is then transferred to a suitable filter and allowed to strain, the active principle being recovered in the filtrate. The residue from the filtration may be washed one or more times with hot water and then pressed, in order to make the extraction of active principle as complete as possible. In performing the filtration step, I may use a filter bag, but a suitable filter press consisting of wooden frames may be substituted with greater efficiency, and time and labor be thereby economized.

The recovery made by washing the residue from said filtration may then be added to the filtrate previously recovered. The solution thus obtained contains the active principle sought to be recovered, presents a clear, yellow color, and is not susceptible to oxidation, even when exposed for a long time to atmospheric air. The solution bearing the active principle is then concentrated by evaporating the same by suitable means, for example, in a vacuum pan having a tin lining, the concentration being preferably carried on until the solution has a syrupy viscousness of fresh honey. This concentrated material contains the active principle and various impurities.

The concentrated syrup is then slowly added to a suitable agent, for example, grain spirit, i. e., ethyl alcohol, preferably 95 per cent, which will act as a solvent of the active principle and a precipitant of impurities. The grain alcohol is preferably used, and in a quantity three times the volume of the syrup, the alcohol and syrup being agitated, preferably by stirring vigorously, in order that the two will be thoroughly mixed. In place of grain spirit, methyl or denatured alcohol may be substituted. When the alcohol and syrup containing the active principle have been thoroughly mixed, the stirring is stopped, whereupon, a copious, sticky mass sinks to the bottom of the vessel containing the same, and over said mass is a straw yellow solution of more or less turbidity. The sticky mass contains minor quantities of the active principle, while the bulk of the active principle is contained in the said yellow supernatant solution. The supernatent solution containing the bulk of the active principle is separated, preferably by decantation, from the sticky mass, and placed in another vessel and is permitted to remain at rest for a sufficient period, in order that the substances giving rise to the turbidity may settle down. The time necessary for this separation will be obvious by observation, but I find that a period of about twelve hours will be sufficient.

The sticky mass, heretofore referred to, is then covered with about one and one-half times its volume of fresh alcohol of the character above described, and is left to stand for a period say of about twelve hours, which will result in the loss of its sticky properties, and in hardening of the mass by the dehydrating action of the alcohol, whereupon, the mass may be pressed by means of an ordinary press, in order to separate out additional quantities of the active principle in solution in the alcohol. The pressed residue may then be soaked again with a necessary quantity of alcohol and the pressing repeated. In repeating the pressing operation, about one-half the quantity of alcohol may be employed as was first used for hardening and dehydrating the sticky mass. The alcohol treatment of the residue mass may be repeated as often as it appears may be necessary to accomplish substantial or desirable recovery of active principle from the mass, but after two such treatments I have found that the amount of active principle still remaining in the mass does not amount to a quantity sufficient to justify further treatment.

The alcoholic solutions containing the active principle as above obtained after settling and decanting the clear solution, are combined, and if desirable or necessary, the combined solution may be filtered through filtering paper or other suitable filtering medium. The solution or filtrate thus obtained is then concentrated again, preferably in a vacuum pan, until a thick liquid, preferably of a specific gravity of 1.12 to 1.15, is obtained, under which conditions practically all of the alcohol is entirely removed.

To this concentrated liquid or solution containing the active principle, ammonia water, U. S. P. concentrated, that is, containing 25 to 30 per cent of ammonia, is added in excess until a strong odor of ammonia can be perceived. The liquid containing the active principle, and to which the ammonia water in excess has been added, is left to stand at ordinary or atmospheric temperature for a period of say a day or two, during which period a raw product of active principle of the suprarenal gland will settle down in crystals which are almost colorless, leaving a supernatant, brownish liquid. The supernatant, brownish liquid is then carefully siphoned off, and the crystalline precipitate which has been separated therefrom, is gathered on a suction filter, and washed with 30 per cent alcohol, either ethyl or methyl, until the filtrate no longer has a brownish color, whereupon, the crystals are finally washed with undiluted alcohol. Any alcohol remaining in contact with the crystals is removed to the greatest extent by suction, or other suitable means, and by pressing the crystals between sheets of absorbent paper, or between absorbent clay plates. The crystalline precipitate of the raw product is then dried in a suitable drying oven at a temperature not exceeding 70° C. The crystalline product thus obtained is a crude product of active principle, and contains organic and inorganic impurities approximating ⅓, more or less, of the total weight of the crude product. The impurities referred to may be organic matter such as amino acids combined with calcium, magnesium, sodium, and potassium, which were contained in the raw glands, besides a larger proportion of phosphates.

The purification of the raw or crude product is carried out according to my invention as follows:—

The crude product is dissolved in a suitable acid, such for example as acetic acid, or any of the other acids hereinafter mentioned, and the solution thus formed treated with alcohol to precipitate impurities, inclusive of mineral matters.

In dissolving one part of the dried crude product in five parts of grain spirit, for most efficient results the quantity of the acid required is calculated chemically, assuming for convenience sake the raw or crude product, as being a pure laevo methylamine-ethanol cathanol catechol ($C_9H_{13}NO_3$ molecular weight 183), one molecular gram of which combines with one molecular gram of a monobasic acid. In actual commercial working I use acetic acid, for the simple reason of its easy procurablity and moderate cost, and also because it is the most efficient acid of which I am aware for the purpose. Any other organic acid such as formic, lactic, butyric and oxalic acid, or even inorganic acids, for example, sulphuric, hydrochloric acid, can be substituted for that purpose with approximately similar result, but acetic is preferable. The required quantity of acetic acid, or of the other acids mentioned, for a given weight of the crude product can be ascertained without difficulty by ordinary chemical calculation. The chemical combining quantity of acetic or other acid thus found, is not, however, sufficient to dissolve the crude or impure product completely, not if even twice as much of the acid be taken, as is called for by combining weights, since the alcohol will precipitate impurities, inclusive of mineral matters, together with a large quantity of active principle combined with, or carried by said impurities. I have discovered, that by increasing the quantity of acetic acid to 3 molecular weights, that is to say, twice as much of the acid in excess than is called for by chemical calculation, the precipitate of impurities thrown down by the alcohol will not contain any considerable amount of the active principle. This is due to the fact that by using a sufficient quantity of acid, as described, the alcohol will not precipitate or carry down any appreciable quantity of the active principle, but will only precipitate the impurities it is desired to eliminate. The solution containing the active principle with precipitate of impurities resulting from the treatment with an excess of acid and with alcohol, as just described, is left to stand over night and the clear part is siphoned off, and the precipitate is filtered by a suction filter. The precipitate thrown down by the alcohol is washed with fresh quantity of alcohol until no more green color reaction is discernible, when it is tested for the active principle with ferric chlorid test solution.

The alcoholic solutions thus obtained containing the active principle in solution are combined and measured and the combined solution is mixed with an equal volume of ether U. S. P. A copious precipitate of impurities is again thrown down which shall then be left to stand for an hour or two to settle down. The ether should not be used in any substantial proportion above that mentioned, as an excess will tend to precipitate the active principle which is to be avoided. When the precipitate subsides, the clear, etheral portion of the solution containing the active principle is siphoned off and the remainder is filtered by suction, so as to be united to the main solution. The washing of the precipitate of impurities with a mixture of ether and alcohol (1:1) is performed, as was the case in the preceding treatment on the alcoholic precipitation of impurities.

The solutions are now united and measured. To it water is added in a quantity corresponding to equal volume of the ether-alcohol solution by volume here on hand and is vigorously shaken. By leaving this mixed liquid stand at rest for awhile, two layers will be seen forming: an upper ethereal layer, clear and colorless, and a lower, aqueous layer of brownish yellow color containing more or less proportions of ether-alcohol, besides the total contents of the active principle in the lower layer. To this mixture comprising said upper and lower layers add a quantity of ether corresponding to $\frac{2}{3}$ by volume of the ether-alcohol solution first used, and shake vigorously as before. By permitting standing of the mixture for awhile the separation of the two layers takes place as before. This time, however, the upper etheral layer has undergone conspicuous alteration. It is colored deep brown, having extracted the coloring impurities from the aqueous portion in which the active principle is held in solution. Besides the volume of that ethereal layer has increased a good deal, amounting almost to $\frac{1}{2}$ of the ether-alcohol solution originally taken.

The lower aqueous layer, now more or less blanched and purified, and containing practically all the active principle by above manipulation, is siphoned out and saturated with strong ammonia water, 25 to 30 per cent U. S. P. until the odor of same is distinctly perceived, and left to stand for an hour or so, whereupon, the separation of the active principle in micro-crystalline powder will be complete, whereupon, the powder is filtered by suction and washed thoroughly with 30 per cent alcohol and finally with strong alcohol for dehydration. The alcohol is then removed by suction as much as possible and the crystalline powder is later pressed between absorbent papers or clay plates. Then the crystalline active principle is dried in vacuum over sulphuric acid or in a draft of air not hotter than 50° C.

The product thus obtained is white micro-crystalline powder. When burnt it leaves almost no ash and possesses the melting point of ranging between 202° to 204° C. showing how pure the substance can be gotten by a single manipulation of purification.

What I claim and desire to secure by Letters Patent of the United States is:—

1. The improvement in the process of extracting the active principle of the suprarenal gland, which consists in subjecting the gland to the action of a proteolytic enzyme before separation of the solution containing the active principle.

2. A process of purifying the crude active principle of the suprarenal gland, which consists in dissolving the same in an acid in quantity in excess of double the combining weight of the said acid with said product, and precipitating impure matter from said solution.

3. A process of purifying the crude active principle of the suprarenal gland, which consists in dissolving the same in an acid in quantity in excess of double the combining weight of the said acid with said product, and precipitating impure matter from said solution with alcohol.

4. A process of purifying the crude active principle of the suprarenal gland, which consists in dissolving the same in an acid in quantity in excess of double the combining weight of the said acid with said product, precipitating impure matter from said solution with alcohol, and separating the solution from the precipitate.

5. A process of purifying the crude active principle of the suprarenal gland, which consists in dissolving the same in an acid in quantity in excess of double the combining weight of the said acid with said product, precipitating impure matter, separating the solution from the precipitate, mixing ether with the solution to precipitate impure matter, and treating the solution to recover the active principle in crystallized form.

6. A process of purifying the crude active principle of the suprarenal gland, which consists in dissolving the same in an acid in quantity in excess of double the combining weight of the acid with the product, precipitating impure matter with alcohol, separating the solution from the precipitate, mixing ether with the solution to precipitate impure matter, separating the solution from the said precipitate, adding water to the solution, agitating the mixture, permitting the mixture to stand to form a supernatant ethereal layer and a subnatant aqueous layer, recovering said aqueous layer, and treating the same with a suitable agent to precipitate the active principle.

7. A process of purifying the crude active principle of the suprarenal gland, which consists in dissolving the same in acid in quantity in excess of double the combining weight of the acid with the product, precipitating impure matter with alcohol, separating the solution from the precipitate, mixing ether with the solution to precipitate impure matter, separating the solution from the said precipitate, adding water and then additional ether to the solution, agitating the mixture so as to remove coloring matter from the active principle, permitting the mixture to stand to form a supernatant ethereal layer and a subnatant aqueous layer, recovering said aqueous layer, and treating the same with a suitable agent to precipitate the active principle.

8. A process of purifying the crude active principle of the suprarenal gland, which consists in dissolving the same in an acid in quantity in excess of double the combining weight of the acid with the product, precipitating impure matter with alcohol, separating the solution from the precipitate, mixing ether with the solution to precipitate impure matter, separating the solution from the said precipitate, adding water to the solution, agitating the mixture, permitting the mixture to stand to form a supernatant ethereal layer and a subnatant aqueous layer, recovering said aqueous layer, saturating the same with ammonia, and permitting crystallization of the active principle.

9. A process of purifying the crude active principle of the suprarenal gland, which consists in dissolving the same in an acid in quantity in excess of double the combining weight of the acid with the product, precipitating impure matter wth alcohol, separating the solution from the precipitate, mixing ether with the solution to precipitate impure matter, separating the solution from the said precipitate, adding water and additional ether to the solution, agitating the mixture so as to remove coloring matter from the active principle, permitting the mixture to stand to form a supernatant ethereal layer and a subnatant aqueous layer, recovering said aqueous layer, saturating the same with ammonia, and permitting crystallization of the active principle.

10. A process of purifying the crude active principle of the suprarenal gland, which consists in dissolving the same in an acid in quantity in excess of double the combining weight of the acid with the product, precipitating impure matter with alcohol, separating the solution from the precipitate, mixing ether with the solution to precipitate impure matter, separating the solution from the said precipitate, adding water and ether to the solution, agitating the mixture, permitting the mixture to stand to form a supernatant ethereal layer and a subnatant aqueous layer, recoving said aqueous layer, saturating the same with ammonia, permitting crystallization of the active principle, and drying said crystals.

In testimony whereof I have hereunto signed my name in the presence of two subscribing witnesses.

KEIZO WOOYENAKA.

Witnesses:
 AGNES E. CUNNEEN,
 C. G. HEYLMUN.